United States Patent [19]
Tabata et al.

[11] Patent Number: 5,869,013
[45] Date of Patent: Feb. 9, 1999

[54] PROCESS AND CATALYST FOR REDUCING $NO_X$ IN EXHAUST COMBUSTION GASES

[75] Inventors: Takeshi Tabata; Mikako Kokitsu, both of Toyonaka; Osamu Okada, Osakasayama, all of Japan; Giuseppe Bellussi, Piacenza; Luigina Maria Flora Sabatino, Milanese, both of Italy

[73] Assignee: Osaka Gas Company Limited, Osaka, Japan

[21] Appl. No.: 941,013

[22] Filed: Sep. 30, 1997

Related U.S. Application Data

[63] Continuation of Ser. No. 772,269, Dec. 23, 1996, abandoned, which is a continuation of Ser. No. 481,333, Oct. 2, 1995, abandoned.

[30] Foreign Application Priority Data

Nov. 4, 1993 [IT] Italy .................................. MI93A2337
May 27, 1994 [IT] Italy .................................. MI94A1091

[51] Int. Cl.$^6$ ........................................................ B01J 8/00
[52] U.S. Cl. .................................. 423/239.2; 423/213.2; 423/213.5
[58] Field of Search .............................. 423/239.2, 213.5, 423/213.2; 502/74

[56] References Cited

U.S. PATENT DOCUMENTS 3,308,069 3/1967 Wadlinger et al. ......... 423/DIG. 27 X
4,867,954 9/1989 Staniulis et al. .
5,149,512 9/1992 Li et al. .

FOREIGN PATENT DOCUMENTS 0 541 008 A1 5/1993 European Pat. Off. .
5220403 8/1993 Japan .......................................... 29/34
2 238 784 6/1991 United Kingdom .
WO94/01365 1/1994 WIPO .

OTHER PUBLICATIONS

"Catalyst for cleaning exhaust gas–comprises zeolite–beta on which copper, copper®, iron® or platinum is supported", Database WPI, Section Ch, Week 9339, Derwent Publications Ltd., London, Great Britain, Class E36, AN 93–308484.

Suzuki Hiromasa, "Exhaust Gas Purifying Catalyst", Patent Abstracts of Japan, vol.: 17, No. 670, C–1139, Dec. 1993, JP, A 5 220 403, Aug. 1993. (abstract only).

*Primary Examiner*—Michael L. Lewis
*Assistant Examiner*—Thomas G. Dunn, Jr.
*Attorney, Agent, or Firm*—Finnegan, Henderson Farabow, Garrett & Dunner, L.L.P.

[57] ABSTRACT

The present invention relates to a process for the catalytic reduction of nitrogen oxides contained in exhaust gases from combustion, which process comprises bringing said exhaust gases into contact with a Beta Zeolite exchanged with suitable amounts of cobalt salts, in the presence of a light hydrocarbon as the reducing agent. The present invention relates also to a catalyst for such a process, which catalyst comprises a Beta zeolite exchanged with cobalt salts, characterized by a Co: zeolite AL molar ratio of<0.5.

11 Claims, 3 Drawing Sheets

PROCESS AND CATALYST FOR REDUCING $NO_x$ IN EXHAUST COMBUSTION GASES

REFERENCE TO RELATED APPLICATIONS

This application is a continuation of application Ser. No. 08/772,269 filed Dec. 23, 1996, now abandoned which is a continuation of Ser. No. 08/481,333, filed Oct. 2, 1995, now abandoned which is a 371 of PCT/JP94/01857 filed Nov. 2, 1994.

BACKGROUND OF THE INVENTION

Field of the Invention

The present invention relates to a process for the catalytic reduction of nitrogen oxides contained in exhaust gases from combustions, which process comprises bringing said exhaust gases into contact with a Beta Zeolite exchanged with suitable amounts of cobalt salts, in the presence of a light hydrocarbon as the reducing agent.

The present invention relates also to a catalyst for such a process, which catalyst comprises a Beta Zeolite exchanged with cobalt salts, characterized by a Co:Zeolite Al molar ratio of<0.5.

The emission of nitrogen oxides (NO and $NO_2$), commonly defined as "$NO_x$", from traveling sources, such as automobiles, and from stationary sources, such as gas turbines and power stations, is among the major sources of atmospheric pollution.

The most effective techniques for removing $NO_x$ from the exhaust gases from combustions, can be classified into two categories:

(1) flame treatment, which limit $NO_x$ generation;

(2) post-combustion treatments.

Typical flame treatments are carried out, e.g., by varying the reaction stoichiometry, or decreasing the combustion temperature. Such treatments make it possible the decrease in $NO_x$ formation to be attained with only limited success.

Among post-combustion treatments, the catalytic processes result to be the most advantageous ones.

At present, nitrogen oxide removal is acoomplished at the industrial level through the so said "selective catalytic reduction" process (SCR process) carried out with ammonia, in the presence of a catalyst constituted by $V_2O_5/TiO_2$, at a temperature comprised within the range of from 300° to 400° C. A conversion of nitrogen oxides of about 90% is described, which, however, decreases under operating conditions. This process also suffers from considerable drawbacks, such as e.g.:

(a) catalyst cost, and short life time of said catalyst, due to poisoning and sintering phenomena;

(b) presence of unreacted ammonia which, per se, is a pollutant;

(c) reaction between ammonia and sulfates, leading to $NH_4HSO_4$ and $(NH_4)_2SO_4$, which are corrosive for the facility components and poison the catalyst;

(d) difficulty of storage, handling and use of ammonia in the facility.

Owing to these problems, processes were studied which, on the one side, make it possible the direct catalytic decomposition to be performed of $NO_x$, and, on the other side, aim at catalytically reducing $NO_x$ in the presence of different reducing agents from ammonia.

For both said process types, the most promising catalysts resulted to be those of zeolitic type, exchanged with transition metal salts.

As regards the direct catalytic decomposition processes, which preferably use ZSM-5 Zeolite exchanged with $Cu^{2+}$ (Iwamoto, Yahiro, Shokubai, Catalyst, 1989, 31, 112), the main drawbacks are:

short catalyst life, due to the fact that the active sites of said catalysts are poisoned by oxygen, increasing amounts of which are formed as the decomposition reaction proceeds;

sharp decrease in conversion rate values if an excess of oxygen is present, as it normally occurs under the operating conditions.

Owing to these problems, research mainly developed towards catalytic processes for $NO_x$ reduction with reducing agents which are different from ammonia.

As possible reducing agents free from environmental problems, light hydrocarbons were taken into consideration. Their use allows to operate also in the presence of oxygen. For example, Hamada et al. (Appl. Catal., 64 L1–L4, 1990) describe the reduction of $NO_x$ into gases containing oxygen which uses, as the catalyst, Zeolites in acidic form and alumina and, as the reducing agent, propane or propene. The best results described by the Authors consist in a conversion of 65%, obtainable with an H-mordenite at 400° C.

Iwamoto et al. [Shokubai 32, (6), 430, 1990] use copper-exchanged Zeolites and lower hydrocarbons as the reducing agents. The obtainable results depend on both hydrocarbon and oxygen concentrations. In the presence of large oxygen excesses, or at not high hydrocarbon concentrations, a considerable decrease is observed in conversion rates.

EP 499 087 and EP 499 286 disclose a method for purifying oxygen-rich exhaust gases containing $NO_x$, CO and methane, in the presence of Zeolites of Y type, ferrierite, mordenite, ZSM-5 and ZSM-11 exchanged with transition metal salts. The highest obtainable $NO_x$ conversion is 50% and is attained when a cobalt-exchanged ZSM-5 Zeolite (Co-ZSM-5) is used, and the reaction Is carried out at 400°–500° C.

U.S. Pat. No. 5,149,512 discloses a catalytic process for destroying $NO_x$ contained in exhaust gases from combustion processes, which uses, Zeolite catalysts having a silicon-:aluminum ratio of>2.5, exchanged with cations selected from cobalt, nickel, iron, chrome, rhodium and manganese. Preferably Zeolites of MFI and MOR types are used; however, also a Beta Zeolite exchanged with cobalt is generally mentioned. This process consists of bringing the combustion gases, containing $NO_x$ and oxygen, into contact with said Zeolites, in the presence of methane as the only reducing gas.

Patent application JP 05220403 discloses a catalyst for the reduction of the nitrogen oxides contained in exhaust gases, comprising a Beta Zeolite with a molar ratio of $SiO_2:Al_2O_3$ comprised within the range of from 10 to 100, exchanged with at least one metal selected from Cu, Co, Ni, Fe and Pt, in such an amount that the molar ratio of metal to aluminum in said Zeolite is comprised within the range of from 0.5 to 2.

In particular, for exemplifying purposes, only mentioned is the use of a Beta Zeolite having a molar ratio of $SiO_2:Al_2O_3$ of 40, which Zeolite is exchanged with Cu, to such an extent that the molar ratio of copper to aluminum in the Zeolite is of 0.53. When the values of this ratio are lower than 0.5, the desired catalytic activity is no longer obtained. The process of nitrogen oxides reduction is carried out in the presence of propene as the reducing agent and at a hourly space velocity of 420,000 $h^{-1}$.

SUMMARY OF THE INVENTION

The present Applicants have unexpectedly found now that the use of a Beta Zeolite exchanged with smaller cobalt amounts than as described in the prior art, jointly with light hydrocarbons other than methane as the reducing agent, at lower gas hourly space velocities than 200,000h$^{-1}$, enables a removal of $NO_x$ to be obtained, which is by far better than as obtained by reducing $NO_x$ in the presence of copper-exchanged Beta Zeolite and unsaturated hydrocarbons as reducing agents, under such conditions as disclosed by JP 05220403.

DETAILED DESCRIPTION

Figure 1:
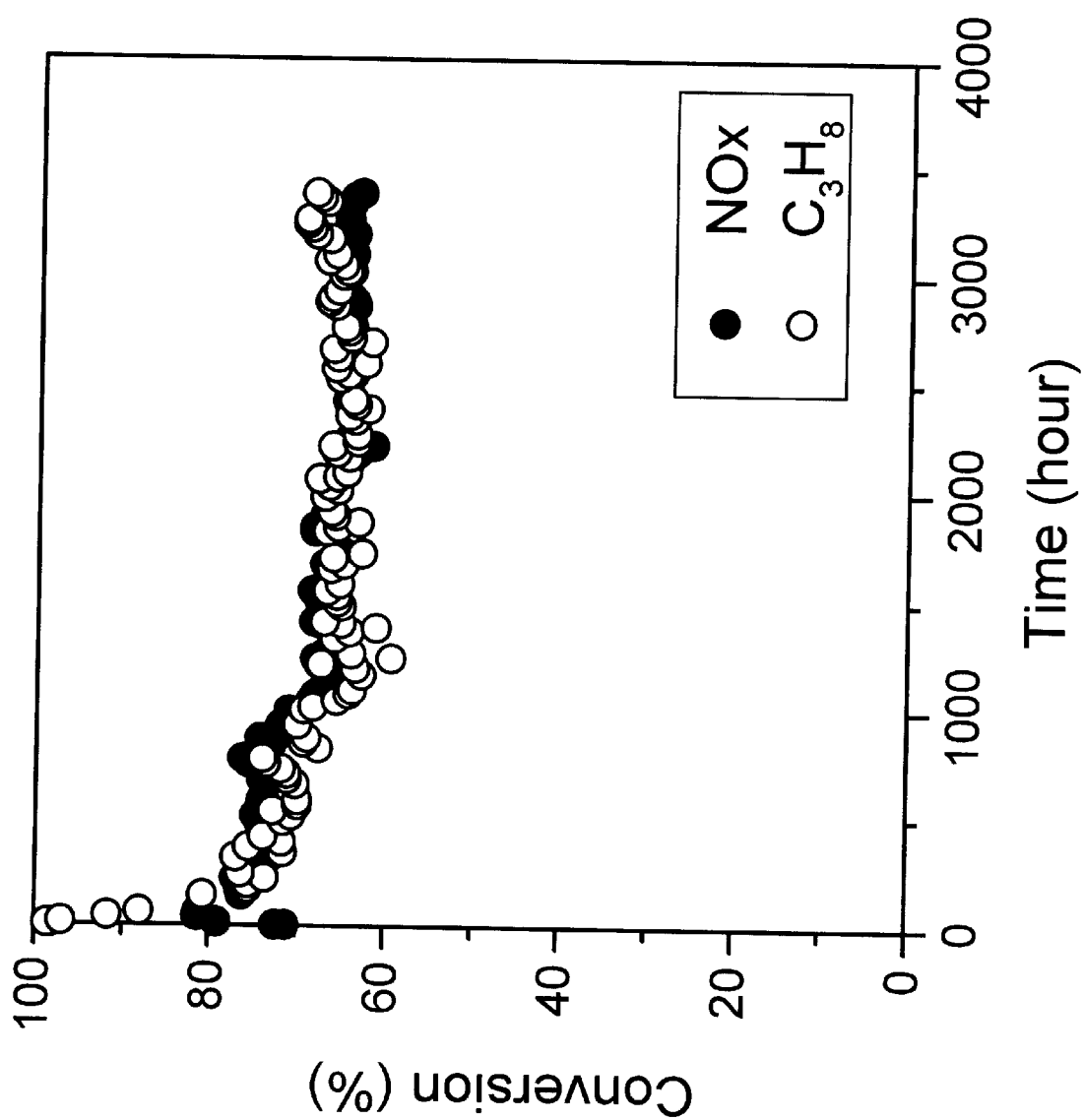
FIG. 1 is a graph showing the long term durability of Co-Beta Zeolite.

In accordance therewith, the present invention relates to a process for the removal of $NO_x$ from oxygen-containing exhaust gases from combustions, which process is characterized in that said combustion exhaust gases are brought into contact with a catalyst constituted by a Beta Zeolite exchanged with cobalt salts, having a molar ratio of $SiO_2:Al_2O_3$ comprised within the range of from 5 to 250, and a molar ratio of Co:Al contained in the Zeolite which is lower than 0.5, corresponding to a cobalt content of between 0.39 and 12.37 wt % of the total zeolite weight, in the presence of a reducing agent selected from gaseous or liquid hydrocarbons containing more than 1 carbon atoms or mixtures thereof, under a pressure comprised within the range of from –1 to 10 kg/cm$^2$-G, at a temperature comprised within the range of from 200° to 650° C., and at a GHSV (gas hourly space velocity)comprised within the range of from 1,000 to 200,000 h$^{-1}$.

The space velocity is preferably comprised within the range of from 1,000 to 100,000 and more preferably from 3,000 to 30,000 h$^{-1}$.

Beta Zeolite is disclosed in U.S. Pat. No. 3,308,069 and in following EP-95 304, EP-159 846, EP-159 847, EP-164 939 and U.S. Pat. No. 5,164,170. Its empirical formula is

wherein:
x is lower than 1,
y is comprised within the range of from 5 to 250,
w is lower than 4,
M is a metal ion,
n is the valency of M, and
Û is a hydrogen ion, an ammonium ion, an organic cation, or a mixture thereof.

For the process according to the present invention, a Co-exchanged Beta Zeolite is preferably used which has a molar of $SiO_2:Al_2O_3$ ratio comprised within the range of from 15 to 75.

Preferably the molar ratio of Co:Al is comprised within the range of from 0.2 to 0.49.

These Zeolite are referred to in the following as "Co-Beta" Zeolites. Cobalt is added by ion exchange, carried out on a Beta Zeolite in which M and Q are H$^+$, or any cobalt-exchangeable cations. The conditions to be used for cobalt introduction are known from the prior art, and are not limitative. For example, Beta Zeolite is added to a solution containing a cobalt-(II) salt and the resulting mixture is stirred at a temperature comprised within the range of from 20° to 100° C. for many hours. Cobalt salts to be used can be, e.g., acetates, oxalates, nitrates, sulfates and chlorides. Cobalt acetate is preferred.

For the process according to the present invention; Co-Beta Zeolite can be mixed with a binding agent, e.g., alumina, silica, titania, zirconia or other refractory oxides, e.g., as pellets or in honeycomb form.

The process for $NO_x$ reduction according to the present invention is preferably carried out at a temperature comprised within the range of from 300° to 600 ° C.

The best results are obtained at a temperature comprised within the range of from 350° to 500° C.

The reducing agent is preferably selected from saturated hydrocarbons having from 2 to 12 carbon atoms, or mixtures thereof. Still more preferably, hydrocarbons having from 2 to 6 carbon atoms are used. The amount of reducing agent used is comprised within the range of from 50 to 10,000 ppm (i.e., parts of reducing agent by volume per million parts of combustion gas products by volume), preferably of from 100 to 3,000 ppm.

Advantageously, the reduction process is carried out under a pressure comprised within the range of from –0.1 to 3 kg/cm$^2$-G.

The combustion gases which can be treated by means of the process according to the present invention are originated by the combustion of fuels in automobile engines, gas turbines, engines using an oxygen-rich mixture and in power stations. Fuels can be, e.g., town gas, natural gas, LPG, gasoline, kerosene, heavy oil and coal, preferably natural gas As regards the composition of the combustion gas products, they, besides $NO_x$ and $O_2$, can contain $SO_x$, CO, $CO_2$, $H_2$, $H_2$O and hydrocarbons, including methane.

$NO_x$ can be present at a concentration comprised within the range of from 10 to 3,000 ppm and $O_2$ can be present at a concentration of from 0.1 to 20%.

The catalysts which comprise a Beta Zeolite having a ratio of $SiO_2:Al_2O_3$ comprised within the range of from 5 to 250, exchanged with cobalt salts in such an amount that the molar ratio of Co to Al in the Zeolite is lower than 0.5, are novel, and, therefore, they are a further object of the present invention. These catalysts are preferably characterized by a molar ratio of $SiO_2:Al_2O_3$ comprised within the range of from 15 to 75. Said Co:Al ratio is preferably comprised within the range of from 0.2 to 0.49.

EXAMPLE NO. 1

Preparation of Co-Beta Zeolite (1)

A Beta Zeolite having an $SiO_2:Al_2O_3$ ratio=22.6 is prepared as disclosed in U.S. Pat. No. 3,308,069.

Thirty grams of this Beta Zeolite, in Na form, is suspended in 120 ml of an 0.2M solution of cobalt-(II) acetate and the suspension is kept 5 hours at 60° C., with magnetic stirring. The solid material is then separated and washed with 4 portion of 100 ml of water. The exchange procedure is repeated. The solid material is centrifuged off and is washed 5 times, each time with a volume of 200 ml of water. The solid material is thoroughly desiccated 5 hours at 110° C., then is calcined 12 hours at 550° C. under a flowing air stream.

The elemental analysis of the resulting Co-Beta Zeolite (1) shows that the content of cobalt is of 2.54% based on total Zeolite weight, corresponding to an ion exchange rate of 77%.

The ratio of Co:Al in the catalyst is 0.385.

EXAMPLE NO. 2

Preparation of Co-Beta Zeolite (2)

Eighty grams of Beta Zeolite, in Na form, having an $SiO_2:Al_2O_3$ ratio 22.3, prepared as disclosed in U.S. Pat. No.

3,308,069, and 8 g of cobalt-(II) acetate tetrahydrate are added to 400 ml of water and the resulting suspension is kept 5 hours at 60° C., with magnetic stirring. The resulting solid material is thoroughly desiccated 5 hours at 110° C. Sixty grams of the resulting thoroughly desiccated material (a) and 8 g of cobalt-(II) acetate tetrahydrate are added to 300 ml of water, and the resulting suspension is kept 5 hours at 60° C., with magnetic stirring. The resulting solid material is then separated and is washed 6 times, each time with a volume of 350 ml of water, and is finally thoroughly desiccated 5 hours in an oven at 110° C. Twenty grams of this desiccated solid material (b) is then calcined at 550° C. under a flowing air stream.

The elemental analysis of the resulting Co-Beta Zeolite (3) shows that the percent content of cobalt is of 2.62%, corresponding to an ion exchange rate of 64%.

The ratio of Co:Al in the catalyst is 0.32.

EXAMPLE NO. 3

Preparation of Co-Beta Zeolite (3)

Fourty grams of the dry solid material (b) from Example No. 2 and 8 g of cobalt-(II) acetate tetrahydrate are added to 300 ml of distilled water and the resulting suspension is kept 5 hours at 60° C., with magnetic stirring. The resulting solid material is separated, is washed 6 times, each time with a volume of 300 ml of water, and then is desiccated 5 hours at 110° C., and is calcined at 550° C. under a flowing air stream.

The elemental analysis of the resulting Co-Beta Zeolite (3) displays a percent cobalt content of 2.97%, corresponding to an ion exchange rate of 72%

The ratio of Co:Al in the catalyst is 0.36.

EXAMPLE NO. 4

Preparation of Co-Beta Zeolite (4)

A Beta Zeolite having an $SiO_2:Al_2O_3$ ratio=22.3 is prepared as disclosed in U.S. Pat. No. 3,308,069.

An amount of 250.14 g of this Beta Zeolite, in Na form, is suspended in 2 l of an 0.2M solution of cobalt-(II) acetate and the suspension is kept 5 hours at 60° C., with magnetic stirring. The solid material is then separated and is washed with 4 portions of 1.6 l of water. The exchange procedure is repeated. The solid material is then centrifuged off and is washed 5 times with portions of 200 ml of water. The solid material is thoroughly desiccated 5 hours at 110° C., then is calcined 12 hours at 550° C. under a flowing air stream.

The elemental analysis of the resulting Co-Beta Zeolite (1) shows that the percent content of cobalt is of 3.0% based on total Zeolite weight, corresponding to an ion exchange rate of 80%.

The ratio of Co:Al in the catalyst is 0.4.

EXAMPLE NO. 5

Preparation of Co-Beta Zeolite (5)

A Beta Zeolite having an $SiO_2:Al_2O_3$ ratio=19.6 is prepared as disclosed in U.S. Pat. NO. 3,308,069.

An amount of 15 g of this Beta Zeolite, in Na form, is suspended in 60 ml of an 0.2M solution of cobalt-(II) acetate and the resulting suspension is kept 5 hours at 60° C., with magnetic stirring. The solid material is then separated and is washed with 4 portions of 100 ml of water. The exchange procedure is repeated. The solid material is then centrifuged off and is washed 5 times with portions of 200 ml of water. The solid material is thoroughly desiccated 5 hours at 110° C., then is calcined 12 hours at 550° C. under a flowing air stream.

The elemental analysis of the resulting Co-Beta Zeolite (1) shows that the percent content of cobalt is of 1.82% based on total Zeolite weight, corresponding to an ion exchange rate of 42%.

The ratio of Co:Al in the catalyst is 0.21.

EXAMPLE NO. 6 (Comparison Example)

Preparation of Cu-ZSM-5

A ZSM-5 Zeolite having an $SiO_2:Al_2O_3$ ratio=56 is prepared as disclosed in GB 1,402,981.

To an amount of 30 g of this Beta Zeolite, in Na form, suspended in 10 ml of water, an 0.2M solution of copper-(II) acetate (35 ml) is added. The suspension is kept 5 hours at 60° C., with constant magnetic stirring. After separating and washing the solid material, the exchange procedure is repeated. The so obtained solid material is separated and washed 6 times with portions of 200 ml of water. The solid material is then thoroughly desiccated 3 hours at 120° C., then is calcined 12 hours at 550° C. under a flowing air stream.

From the elemental analysis a percent content of copper of 1.28% results, corresponding to an ion exchange rate of 72%.

EXAMPLE NO. 7 (Comparison Example)

Preparation of Co-ZSM-5

The same procedure of above Example No. 6 is repeated, but using a solution of cobalt-(II) acetate.

From the elemental analysis a percent content of cobalt of 1.28% results, which corresponds to an ion exchange rate of 83%.

EXAMPLE NO. 8 (Comparison Example)

Preparation of Co-MOR

An amount of 15.0 g of mordenite (Zeolon, ex Norton) is suspended in 110 ml of an 0.2M solution of cobbalt-(II) acetate. The suspension is heated up to 60° C., and is kept 5 hours at this temperature, with constant magnetic stirring. The resulting solid material is separated, is washed, and is submitted again to the exchange procesure. The resulting solid product is separated, is washed with portions of 300 ml of water (5 times), is desiccated 3 hours at 120° C., and is finally calcined 12 hours at 550° C.

The percent cobalt content results to be of 4.41%; corresponding to an ion exchange rate of 70%.

EXAMPLE NO. 9

Catalytic reduction of $NO_x$ (a) General Procedure

A volume of 4 cc of granulated/sieved catalyst (particle size 1–2 mm) is placed in the centre of a through-flow reactor consisting of a stainless steel tube. The reactor temperature is increased up to the desired value, with a through-flow of helium.

The reaction mixture to be tested is admixed with water by means of a pump. The resulting mixture is then fed to the reactor, with a flow rate of 1 l/minute (GHSV=15,000).

When the gas composition at reactor outlet turns into constant (30 minutes=1 hour), the composition thereof is evaluated by means of a chemoluminescence $NO_x$ analyzer, and a gas-chromatograph in order to measure $H_2$, $O_2$, CO, $CH_4$, $C_2H_4$, $C_2H_6$, $C_3H_6$, $C_3H_8$, $C_4H_{10}$. The gas composition is analysed after that any present water is condensed and removed.

(b) Results

The catalysts from Example Nos. 1–5 were tested, according to the procedure as disclosed under above (a) point, for the catalytic reduction of $NO_x$ in the presence of propane and oxygen. For each catalyst, the reduction of $NO_x$ was carried out at 673° and 773° K. The composition of the gas mixture which is submitted to treatment is as follows:

NO=500 ppm;
CO=1,000 ppm;
$H_2$=660 ppm;
$O_2$=10 %;
$CO_2$=6 %;
$H_2O$=9 %;
propane=1,000 ppm.

In Table 1, the obtained values of $NO_x$ conversion and, in brackets, of propane conversion, are reported:

TABLE 1

| Example No. | Catalyst | Temperature (°K.) 673 | 773 |
|---|---|---|---|
| 1 | Co-Beta (1) | 72.1 (94.0) | 72.7 (100.0) |
| 2 | Co-Beta (3) | 58.1 (61.6) | 73.8 (83.7) |
| 3 | Co-Beta (3) | 76.5 (96.2) | 81.4 (99.7) |
| 4 | Co-Beta (4) | 83.7 (94.7) | 86.0 (99.8) |
| 5 | Co-Beta (5) | 65.5 (97.8) | 70.7 (100.0) |

The conversion of $NO_x$ was computed as follows:

$NO_x$ conversion (%)=[$NO_{x(f)}$-$NO_{x(o)}$]/$NO_{x(f)}$-100 wherein:

$NO_{x(f)}$ is the concentration of $NO_x$ fed to the reactor, and $NO_{x(o)}$ is the concentration of $NO_x$ at reactor outlet.

Propane conversion was calculated according to an analogous procedure.

EXAMPLE NO. 10

The catalyst from Example No. 4 was tested, according to the procedure as disclosed under above (a) point, for the catalytic reduction of $NO_x$ in the presence of pentane and oxygen. The reduction of $NO_x$ was carried out at 673° and 773° K. The composition of the gas mixture which is submitted to treatment is as follows:

NO=500 ppm;
CO=1,000 ppm;
$H_2$=660 ppm;
$O_2$=10%;
$CO_2$=6%;
$H_2O$=9%;
n-pentane=600 ppm.

In Table 2, the obtained values of $No_x$ conversion and, in brackets, of pentane conversion, are reported:

TABLE 2

| Example No. | Catalyst | Temperature (°K.) 673 | 773 |
|---|---|---|---|
| 4 | Co-Beta (4) | 77.4 (85.3) | 60.1 (100.0) |

EXAMPLE NO. 11 (Comparison Example)

In Table 3, for comparison purposes, the results have been reported which are obtained in JP 05220403 for $NO_x$ reduction using, as catalyst, a Cu-seta Zeolite which had an $SiO_2/Al_2O_3$ ratio of 40 and a Cu/Al ratio of 0.53 (Cu-Beta-a Zeolite).

The reduction was carried out at 673° and 723° K., in the presence of propene, at a hourly space velocity of 420,000 $h^{-1}$. The composition of the gas mixture which is submitted to treatment is as follows:

NO=1,000 ppm;
CO=1,000 ppm;
$H_2$=3,000 ppm-1
$C_3H_6$=800 ppm.
$O_2$=4.3%
$CO_2$=11.9%;
$H_2O$=2.3%;

TABLE 3

| Example No. | Catalyst | Temperature (°K.) 673 | 723 |
|---|---|---|---|
|  | Cu-Beta-a | 41 (90) | 45 (99) |

By comparing the conversion results reported in Table 3 to the results obtained according to the present invention, as reported in Tables 1 and 2, it clearly appears how the use of a Beta Zeolite exchanged with cobalt, with a lower Co:Al ratio than 0.5, in combination with saturated hydrocarbons as reducing agents, makes it possible better conversion rates to be obtained, than as attained by operating according to JP 05220403.

EXAMPLE NO. 12 (Comparison Example)

The comparison catalysts from Example Nos. 6–8 were tested, according to the procedure as disclosed under above (a) point, for the catalytic reduction of $NO_x$ in the presence of propane and oxygen. For each catalyst, the reduction of $NO_x$ was carried out at 673° and 773° K. The composition of the gas mixture which is submitted to treatment is as follows:

NO=500 ppm;
CO=1,000 ppm;
$H_2$=660 ppm;
$O_2$=10%;
$CO_2$=6%;
$H_2O$=9%;
propane=1,000 ppm.

In Table 4, the obtained values of $NO_x$ conversion and, in brackets, of propane conversion, are reported.

TABLE 4

| Example No. | Catalyst | Temperature (°K.) | |
|---|---|---|---|
| | | 673 | 773 |
| 6 | Cu-ZSM-5 | 13.9 (32.5) | 39.0 (100.0) |
| 7 | Co-ZSM-5 | 28.6 (48.4) | 49.6 (89.7) |
| 8 | Co-MOR | 14.6 (21.6) | 30.6 (100.0) |

By comparing the conversion results reported in Table 4 to the results otained according to the present invention, as reported in Tables 1 and 2, in this case too, it clearly appears how the use of a Beta Zeolite exchanged with cobalt, with a lower Co:Al ratio than 0.5, in combination with saturated hydrocarbons as reducing agents, makes it possible better conversion rates to be obtained than as supplied, under the same operating conditions, by the best catalysts known from the prior art.

COMPARISON EXAMPLE NO. 13

Reduction of $NO_x$ catalysed by Co-Beta Zeolite, in the presence of methane

The catalyst prepared according to Example No. 1 were tested, according to the procedure as disclosed under (a) point of Example No. 9 , for the catalytic reduction of $NO_x$ in the presence of methane and oxygen, as disclosed in U.S. Pat. No. 5,149,512.

The reduction of $NO_x$ was carried out at 673° and 773° K. The composition of the gas mixture which is submitted to treatment is as follows:
NO=500 ppm;
CO 1,000 ppm;
$H_2$=660 ppm;
$O_2$=10%;
$CO_2$=6%;
$H_2O$=9%;
methane=2,000 ppm.

In Table 5, the obtained values of $NO_x$ conversion and, in brackets, of methane conversion, are reported.

TABLE 5

| Example No. | Catalyst | Temperature (°K.) | |
|---|---|---|---|
| | | 673 | 773 |
| 6 | Co-Beta | 0.0 (3.0) | 39.0 (100.0) |

It clearly appears that by using a Beta Zeolite exchanged with cobalt in combination with suitable saturated hydrocarbons as reducing agents, results can be obtained which are by far better than those results which can be obtained when this same Zeolite is used in combination with methane as the reducing agent, as disclosed in U.S. Pat. No. 5,149,512.

EXAMPLE NO. 14

Life test

A Beta Zeolite having an $SiO_2/Al_2O_3$ molar ratio=16.3 is prepared as disclosed in U.S. Pat. No. 3,308,069.

15 grams of this Beta Zeolite, in Na form, is suspended in 70 ml of a 0.2M solution of cobalt (II) acetate and the suspension is kept 5 hours at 60° C., with magnetic stirring. The solid material is then separated and washed with 4 portions of 100 ml of water. The exchange procedure is repeated, the solid material is centrifuged off and is washed 6 times, each time with a volume of 100 ml of water. The solid material is desiccated 5 hours at 110° C., then is calcined 5 hours at 550° C. under a flowing air stream.

The elemental analysis of the resulting Co-Beta Zeolite shows that the content of cobalt is of 4.61% based on the total zeolite weight, corresponding to a ion exchange rate of 98%. The ratio of Co:Al in the catalyst is 0.49.

This catalyst was tested for the catalytic reduction of $NO_x$ during a time period of 3,500 hours.

The same procedure was used, which is disclosed under point (a), Example No. 9, at the temperature of 673° K. The composition of the gas mixture which is submitted to treatment is as follows:
NO=150 ppm;
CO=500 ppm;
$H_2$=250 ppm;
$O_2$=10%;
$CO_2$=6%;
$H_2O$=9%;
$SO_2$=0.3 ppm;
methane=1,000 ppm;
propane=500 ppm.

The trend of the % $NO_x$ conversion rate values as a function of time, is reported in the chart of FIG. 1.

From such a chart, one will clearly see that Co-Beta Zeolite used in the present invention displays a very long operating life time and that its activity remains at a very good level even after a 3,000-hours use time.

The presence of methane in the gas mixture does not contribute to the obtained results, as already demonstrated in the preceding Example No. 13 herein.

EXAMPLE NO. 15

Comparison Life test

The catalyst from Comparison Example No. 6 was tested for the reduction of $NO_x$ during a time period of 700 hours. The same procedure was used, which is disclosed under point (a), Example No. 10, at the temperature of 773° K. The composition of the gas mixture which is submitted to treatment is the same as of Example No. 14.

Figure 2:
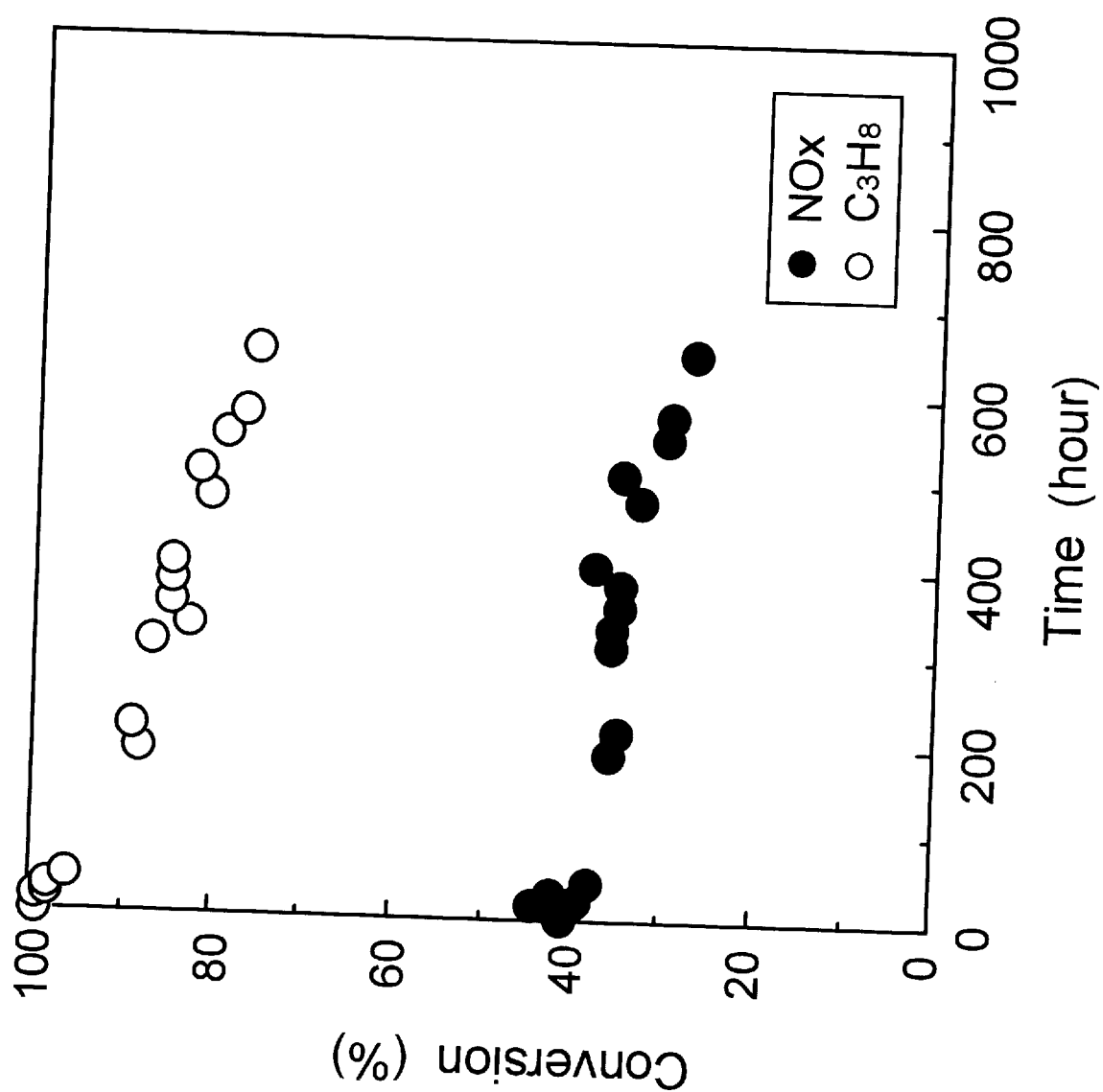
FIG. 2 is a graph showing the durability of Cu-ZSM-5.

The trend of the % $NO_x$ conversion rate values as a function of time, is reported in the chart of FIG. 2.

From such a chart, one will clearly see that the catalyst known from the prior art displays a considerable tendency to undergo decay, and after 700 hours, its activity has undergone a decrease of 25%.

EXAMPLE 16 (Comparison Example)

20 g of dried Co-Beta from Example No. 3 was impregnated with cobalt acetate hydrate, dried at 120° C. for 5 h and then calcined at 550° C. in air stream for 5 h. The elemental analysis of the resulting Co-Beta shows that the content of cobalt is of 4.76% based on total zeolite weight, corresponding to an ion exchange rate of 128%. The ratio of Co/Al in the catalyst is 0.64.

This catalyst was tested for the catalytic reduction of $NO_x$ under the same conditions of Example 12. In Table 6, the obtained values of $NO_x$ conversion and, in brackets, of propane conversion, are reported:

TABLE 6

| Example | | Temperature (°K.) | |
|---|---|---|---|
| No. | Catalyst | 673 | 773 |
| 16 | Co-Beta (6) | 67.2 (90.4) | 20.7 (100.0) |

COMPARISON EXAMPLE NO. 17

5 g of Bets ($SiO_2/Al_2O_3$=22.3), in H form, is suspended in 1 litre of 0.0035M solution of Cu-(II) acetate and the suspension is kept 18 hours at room temperature with magnetic stirring, followed by adding aqueous $NH_3$ to adjust pH=11. The solid material is then separated and is washed with 2 portions of 1 litre each, of water. The solid material is desiccated 5 hours at 100° C., then is calcined 9 hours at 500° C. under a flowing air stream.

The elemental analysis of the resulting Cu-Beta (2) shows that the present content of copper is of 4.0 wt %, corresponding to an Ion exchange ratio of 107%, Co:Al of 0.53.

The result of the same catalytic activity test as Example 12 is shown in Table 7.

TABLE 7

| Example | | Temperature (°K.) | |
|---|---|---|---|
| No. | Catalyst | 673 | 773 |
| 17 | Co-Beta (2) | 15.1 (62.5) | 36.4 (99.5) |

COMPARISON EXAMPLE NO. 18

The catalyst from Comparison Example No. 17 was tested for the reduction of $NO_x$ during a time period of 700 hours. The same procedure was used, which is disclosed under point (a), Example No. 10, at the temperature of 773° K. The composition of the gas mixture which is submitted to treatment is the same as of Example No.14. The trend of the conversions of $NO_x$ and propane as a function of time is reported in the chart of FIG. 3.

Figure 3:
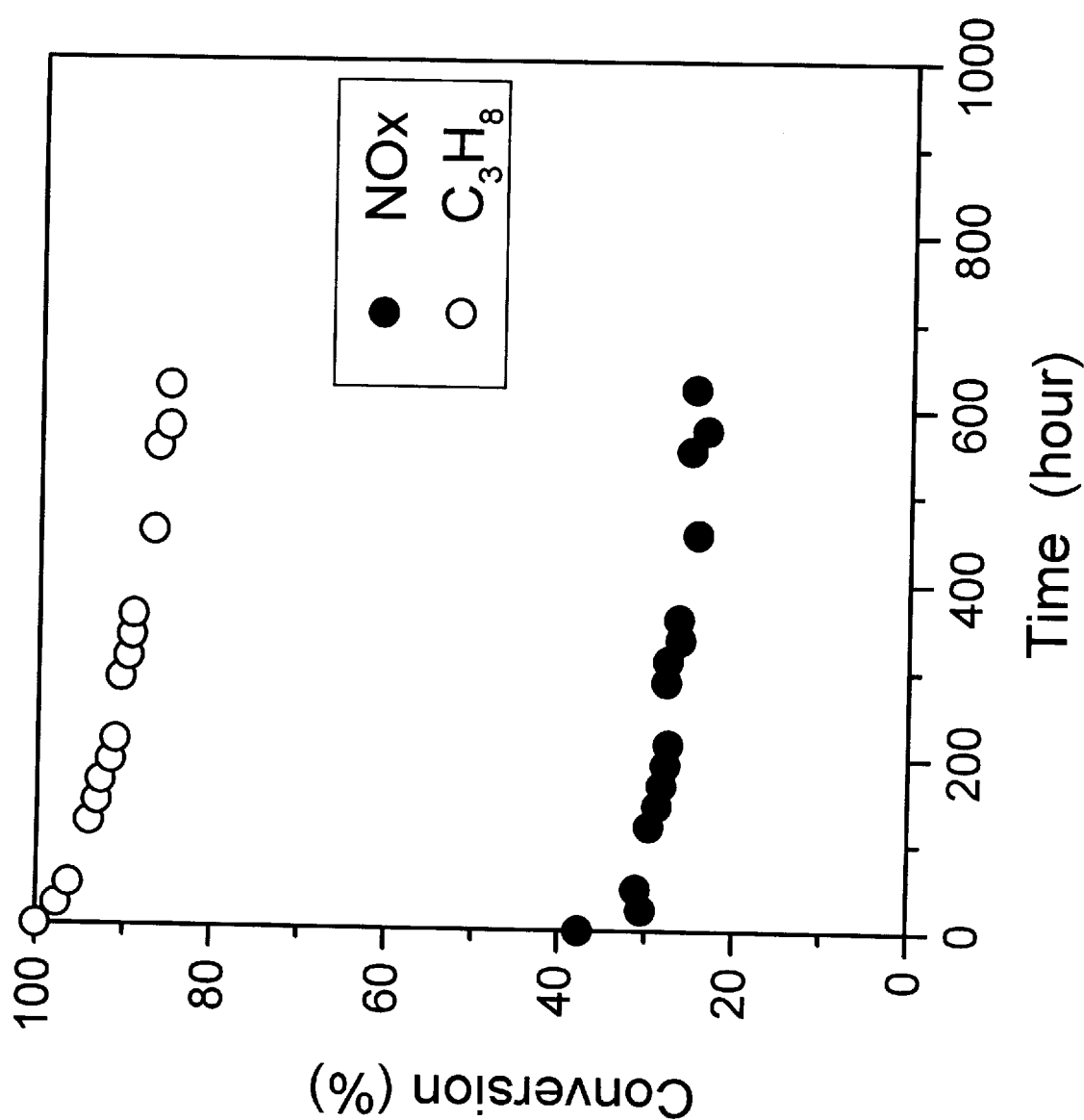
FIG. 3 is a graph showing the durability of Cu-Beta Zeolite.

It is clearly observed in FIG. 3 that both $NO_x$ conversion and propane conversion decayed with time, and the deactivation tendency was similar to Cu-ZSM-5 as shown in FIG. 2.

We claim:

1. Process for the removal of $NO_x$ from exhaust gases containing oxygen, water vapor and sulfur oxide(s) from combustions, which process is characterized in that said combustion exhaust gases are brought into contact with a catalyst comprising a Beta Zeolite exchanged with cobalt salts, having a molar ratio of $SiO_2:Al_2O_3$ within the range of from 5 to 250, and a molar ratio of Co:Al contained in the Zeolite which is lower than 0.5, corresponding to a cobalt content of between 0.39 and 12.37 wt % of the total zeolite weight, in the presence of a reducing agent selected from gaseous or liquid hydrocarbons containing more than 1 carbon atom or mixtures thereof, under a pressure within the range of from −1 to 10 kg/cm²-G, at a temperature within the range of from 200° to 650° C., and at a GHSV (gas hourly space velocity) within the range of from 1,000 to 200,000 $h^{-1}$.

2. Process according to claim 1, in which the Beta Zeolite has a molar ratio of $SiO_2:Al_2O_3$ within the range of from 15 to 75.

3. Process according to claims 1 or 2, in which the molar ratio of Co:Al in the Zeolite is within the range of from 0.2 to 0.49.

4. Process according to claim 1, in which the reducing agent is selected from saturated $C_2$–$C_{12}$ hydrocarbons, or a mixture thereof.

5. Process according to claim 4, in which the reducing agent is selected from saturated $C_2$–$C_6$ hydrocarbons or a mixture thereof.

6. Process according to claim 1, carried out under a pressure comprised within the range of from −0.1 to 3 kg/cm²-G.

7. Process according to claim 1, carried out at a temperature within the range of from 350° to 500° C.

8. Process according to claim 1, carried out at a GNSV (gas hourly space velocity) within the range of from 1,000 to 100,000 $h^{-1}$.

9. Process according to claim 8, carried out at a GHSV (gas hourly space velocity) comprised within the range of from 3,000 to 30,000 $h^{-1}$.

10. The process according to claim 1, wherein the exhaust gases are exhaust gases released by automobiles.

11. The process according to claim 1, wherein the exhaust gases are exhaust gases released by gas turbines, engines using oxygen=rich mixtures and power stations.

* * * * *

UNITED STATES PATENT AND TRADEMARK OFFICE
CERTIFICATE OF CORRECTION

PATENT NO. : 5,869,013
DATED : February 9, 1999
INVENTOR(S) : Takeshi Tabata et al.

It is certified that error appears in the above-identified patent and that said Letters Patent is hereby corrected as shown below:

On the title page:

Item: [73] should read --Assignee: Osaka Gas Company Limited, Osaka, Japan and

Eniricerche S.p.A., Milan, Italy--

Signed and Sealed this

Twenty-ninth Day of August, 2000

Attest:

Q. TODD DICKINSON

Attesting Officer

Director of Patents and Trademarks